(12) United States Patent
Kumfer et al.

(10) Patent No.: US 12,139,425 B2
(45) Date of Patent: Nov. 12, 2024

(54) WET AIR OXIDATION OF A SPENT MATERIAL WITH SPENT CAUSTIC ADDITION

(71) Applicant: LUMMUS TECHNOLOGY LLC, Houston, TX (US)

(72) Inventors: Bryan J. Kumfer, Ringle, WI (US); Simon Larson, Wausau, WI (US)

(73) Assignee: LUMMUS TECHNOLOGY LLC, Houston, TX (US)

( * ) Notice: Subject to any disclaimer, the term of this patent is extended or adjusted under 35 U.S.C. 154(b) by 537 days.

(21) Appl. No.: 17/271,640

(22) PCT Filed: Aug. 8, 2019

(86) PCT No.: PCT/US2019/045679
§ 371 (c)(1),
(2) Date: Feb. 26, 2021

(87) PCT Pub. No.: WO2020/046554
PCT Pub. Date: Mar. 5, 2020

(65) Prior Publication Data
US 2021/0323854 A1    Oct. 21, 2021

Related U.S. Application Data

(60) Provisional application No. 62/723,777, filed on Aug. 28, 2018.

(51) Int. Cl.
*C02F 11/08*    (2006.01)

(52) U.S. Cl.
CPC ........ *C02F 11/08* (2013.01); *C02F 2301/066* (2013.01)

(58) Field of Classification Search
CPC ...... C02F 2301/066; C02F 11/08; C02F 1/26; C02F 1/441; C02F 1/74; C02F 1/78; C02F 3/1268
See application file for complete search history.

(56) References Cited

U.S. PATENT DOCUMENTS

| | | | |
|---|---|---|---|
| 9,630,867 B2 | 4/2017 | Kumfer et al. | |
| 10,053,375 B2 * | 8/2018 | Kumfer | ................. C10G 19/02 |
| 2006/0060541 A1 | 3/2006 | Abazajian | |
| 2015/0151999 A1 | 6/2015 | McKay et al. | |

FOREIGN PATENT DOCUMENTS

| | | | |
|---|---|---|---|
| CN | 101553435 A | 10/2009 | |
| CN | 103663842 A | 3/2014 | |
| CN | 104870380 A | 8/2015 | |
| CN | 106587480 A | 4/2017 | |
| WO | WO-2018022403 A2 * | 2/2018 | .......... B01D 61/025 |
| WO | WO-2018044679 A1 * | 3/2018 | ................ C02F 1/26 |

OTHER PUBLICATIONS

PCT International Search Report and Written Opinion of the International Searching Authority mailed Nov. 20, 2019 corresponding to PCT Application No. PCT/US2019/045679 filed Aug. 8, 2019.

* cited by examiner

*Primary Examiner* — Jonathan Miller
(74) *Attorney, Agent, or Firm* — Calfee, Halter & Griswold LLP

(57) ABSTRACT

There are disclosed processes and systems wet air oxidation systems and processes which provide for the combined treatment of a spent caustic with a spent material (e.g., spent carbon, spent biological material, or combinations thereof) to produce a regenerated spent material stream.

9 Claims, 2 Drawing Sheets

WET AIR OXIDATION OF A SPENT MATERIAL WITH SPENT CAUSTIC ADDITION

FIELD

The present disclosure relates generally to chemical treatment systems and processes, and more particularly to wet air oxidation systems and processes which provide for the combined treatment of a spent caustic with a spent material (e.g., spent carbon, spent biological material, or combinations thereof) to produce a regenerated material stream.

BACKGROUND

Wet air oxidation (WAO) is a well-known technology for treating process streams and is widely used, for example, to destroy pollutants in wastewater. The process involves aqueous phase oxidation of undesirable constituents by an oxidizing agent, generally molecular oxygen from an oxygen-containing gas, at elevated temperatures and pressures. More particularly, the process can convert organic contaminants to carbon dioxide, water, and biodegradable short chain organic acids, such as acetic acid. Inorganic constituents including sulfides, mercaptides, and cyanides can also be oxidized. WAO may be used in a wide variety of applications to treat process streams for subsequent discharge, in-process recycle, or as a pre-treatment step for a conventional biological treatment plant.

Systems employing activated carbon, such as powdered activated carbon treatment (PACT) and granular activated carbon (GAC) systems, utilize different activated carbons to remove contaminants from various fluid streams. At some point, the ability of the activated carbon to remove further contaminants decreases. The wet air oxidation (WAO) systems discussed above have thus been employed to regenerate spent carbon by oxidizing components adsorbed on the spent carbon. When biological solids are also present, the WAO system may also simultaneously volatilize components associated with the biological material. In some instances, only biological material may be provided, in which case, the biological solids may be volatilized and/or solubilized by subjecting the spent biological material to wet air oxidation. The solubilized biological solids can be recycled to the biological treatment system. Collectively, the spent carbon, spent biological material, and combinations thereof will be referred to as "spent material" herein. In addition, it is appreciated by the term "spent," it is meant that the ability of the carbon material and/or biological material to reduce a targeted contaminant or contaminants in a subject fluid has at least been reduced through its use.

Oftentimes, industrial wastewater treatment facilities, including refineries, employ treatment processes wherein a wastewater stream comprising an amount of chemical oxygen demand (COD), for example, is subjected to biological treatment and/or activated carbon treatment to reduce an amount of the COD in the wastewater. Periodically, the ability of the biological material and/or activated carbon to eliminate the COD will be reduced. As mentioned, the resulting spent material may be subjected to wet air oxidation to regenerate the spent material. Oftentimes, the same treatment facility also generates a spent caustic wastewater stream. These high pH wastewater streams comprise a chemical oxygen demand (COD) concentration, including sulfides, mercaptans, thiosulfate, and phenols, all of which must be reduced below allowable limits before to discharge.

To date, a second WAO system is typically employed to treat the spent caustic in order to oxidize these contaminants therein and generate a treated stream comprising a reduced COD concentration. WAO systems are typically highly capitally intensive. Given the comparatively low volume and flow rate of the spent caustic streams generated, the separate treatment of the spent caustic makes little economic sense. Alternatively, the spent caustic has been combined with the wastewater feed and subjected to biological and/or activated carbon treatment with the spent material periodically directed to a wet air oxidation unit for regeneration. However, there are known issues with combining spent caustic at this point in the system. For one, the sulfide content in many spent caustics is known to be harmful to biological populations. In view of the above, there is a need in the art for the treatment of spent caustic without significant capital costs or detriment to existing system components.

SUMMARY

The present inventors have surprisingly found that the addition of a spent caustic to a wet air oxidation system containing or receiving also a spent material provided an effective process for treating both streams without detrimental effects. In particular, the addition of various concentrations of the spent caustic to the spent material was surprisingly found not to have any significant detrimental effect on the regeneration of the spent material. Additionally, the systems and processes described herein provide a solution for the handling and disposal of the spent caustic without the need for any significant additional capital equipment or processes.

Thus, in accordance with one aspect, there is provided a treatment process. The process comprises combining an amount of spent material with an amount of a spent caustic to generate a combined waste stream; and subjecting the combined waste stream to a wet air oxidation process to produce a regenerated material stream.

In accordance with another aspect, there is provided a treatment system comprising a wet air oxidation unit; and, within the wet air oxidation unit, a combined wastewater stream comprising a spent caustic and a spent material. The wet air oxidation unit is configured to carry out a wet air oxidation process on the combined waste stream at elevated temperature and pressure in the presence of oxygen to produce a regenerated spent material stream.

BRIEF DESCRIPTION OF THE DRAWINGS

The invention is explained in the following description in view of the drawings that show.

DETAILED DESCRIPTION

Figure 1:
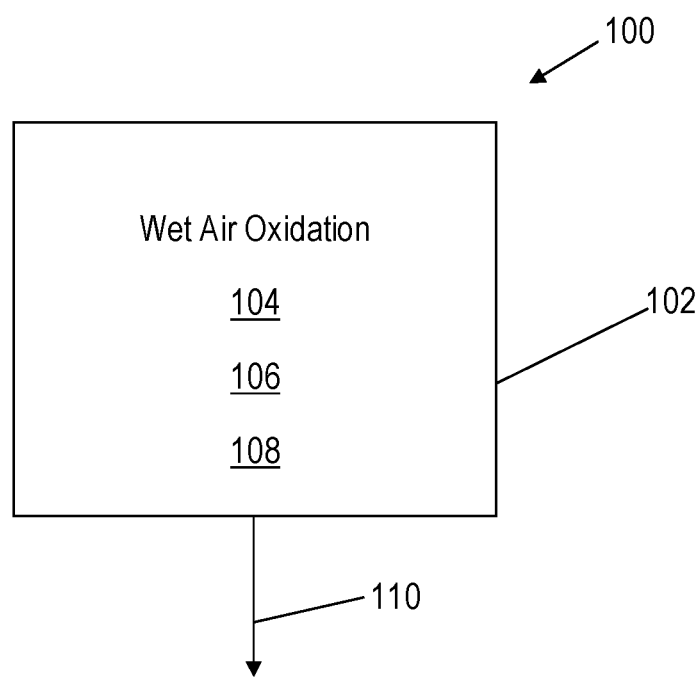
FIG. 1 is a schematic of a wet air oxidation (WAO) system in accordance with an aspect of the present invention.

Now referring to the figures, there is shown a treatment system 100 comprising a wet air oxidation unit 102 as is known in the art. Within the wet air oxidation unit 102, there is provided a combined waste stream 104 comprising an amount of a spent caustic 106 and an amount of a spent material 108 as described herein. The spent material 108 comprises an amount of spent activated carbon, spent biological material, or combinations thereof. Upon being subjected to the wet air oxidation process in the wet air oxidation unit 102, the spent material 108 is regenerated and a regenerated material stream 110 is produced.

The spent caustic 106 may comprise any refinery spent caustic or sulfidic spent caustic as is known in the art. As used herein, the term "refinery spent caustic" refers to spent caustic generated in the operation of equipment and processes such as those which may be found at a petroleum refinery. Refinery spent caustic may have high levels of chemical oxygen demand (COD), in some cases between about 10,000 mg/L and 500,000 mg/L or more. Refinery spent caustic may contain one or more of naphthenic spent caustics or cresylic spent caustics. As used herein, the term "about" refers to a value which is ±1% of the stated value.

Naphthenic spent caustics may be produced from the scrubbing of kerosene and jet fuels and may contain high concentrations of organic compounds consisting of naphthenic acids, and also may contain phenol compounds and reduced sulfur compounds. Naphthenic spent caustics may also contain high levels of chemical oxygen demand (COD), in some cases greater than 100,000 mg/L. Naphthenic spent caustics may also contain thiosulfates and naphthenic acids, which may be broken down in a wet air oxidation process at temperatures above about 220° C. to about 280° C. or higher. Cresylic spent caustics may be produced from the scrubbing of gasoline and may contain high concentrations of phenol compounds (cresylic acids) and may also contain reduced sulfur compounds.

In another embodiment, the spent caustic 106 comprises a sulfidic spent caustic. Sulfidic spent caustics may be produced from the scrubbing of hydrocarbons and may contain high concentrations of reduced sulfur compounds, such as sulfides and mercaptans, as well as organic carbon concentrations. In a particular embodiment, the sulfidic spent caustic comprises an ethylene spent caustic. The term "ethylene spent caustic" refers to spent caustic generated in the operation of equipment and processes such as those which may be found at an ethylene production facility, e.g., caustic used in the scrubbing of ethylene.

For example, ethylene spent caustic may come from the caustic scrubbing of cracked gas from an ethylene cracker. This liquor may be produced by a caustic scrubbing tower. Ethylene product gas may be contaminated with $H_2S(g)$ and $CO_2(g)$, and those contaminants may be removed by absorption in a caustic scrubbing tower to produce NaHS(aq) and $Na_2CO_3$(aq). The sodium hydroxide may be consumed and the resulting wastewater (ethylene spent caustic) contaminated with the sulfides, carbonates, and a small fraction of organic compounds. Insoluble polymers resulting from the condensation of olefins during scrubbing may also be present. Further examples of spent caustics are set forth in U.S. Pat. No. 9,630,867, the entirety of which is hereby incorporated by reference.

To reiterate, as used herein, the term "spent material" refers generally herein to an activated carbon, biological material, or combination thereof whose ability to reduce an amount of a target contaminant, e.g., an amount of organics or chemical oxygen demand (COD), has at least been reduced through its use for the same purpose. The spent material 108 is typically in a slurry form such that it is flowable to the wet air oxidation unit 102. In an embodiment, the spent material 108 comprises an amount of activated carbon which is suitable for the adsorption of organic species thereon. The activated carbon may comprise granulated activated carbon (GAC) or powdered activated carbon (PAC) as is known in the art. In an embodiment, the activated carbon comprises powdered activated carbon.

In addition or instead, the spent material 108 may comprise an amount of biological material. In particular, the biological material (or biomass) may comprise any bacteria or combination of bacteria suitable to thrive in anoxic and/or aerobic conditions. Representative microorganisms for use herein may be from one or more of the following bacteria families: Acetobacteraceae, Acidobacteriaceae, Aeromonadaceae, Alcaligenaceae, Alteromonadaceae, Anaerolineaceae, Aurantimonadaceae, Bacillaceae, Bacteroidaceae, Beijerinckiaceae, Bradyrhizobiaceae, Brevibacteriaceae, Brucellaceae, Burkholderiaceae, Burkholderiales, Campylobacteraceae, Caulobacteraceae, Chitinophagaceae, Chromatiaceae, Chromobacteriaceae, Chroococcales, Clostridiaceae, Clostridiales, Clostridiales Family XI. Incertae Sedis, Clostridiales Family XIII. Incertae Sedis, Comamonadaceae, Cryomorphaceae, Cytophagaceae, Desulfobacteraceae, Desulfobulbaceae, Desulfomicrobiaceae, Ectothiorhodospiraceae, Enterobacteriaceae, Erysipelotrichaceae, Erythrobacteraceae, Flavobacteriaceae, Gamma proteobacteria, Hydrogenophilaceae, Hyphomicrobiaceae, Legionellaceae, Methylobacteriaceae, Methylococcaceae, Methylocystaceae, Methylophilaceae, Microbacteriaceae, Micrococcineae, Moraxellaceae, Mycobacteriaceae, Nitrosomonadaceae, Nostocaceae, Oxalobacteraceae, Peptostreptococcaceae, Phycisphaeraceae, Phyllobacteriaceae, Planctomycetaceae, Porphyromonadaceae, Pseudoalteromonadaceae, Pseudomonadaceae, Rhizobiaceae, Rhizobiales, Rhodobacteraceae, Rhodobiaceae, Rhodocyclaceae, Rhodospirillaceae, Rhodospirillales, Rickettsiales, Rikenellaceae, Ruminococcaceae, Saprospiraceae, Shewanellaceae, Sinobacteraceae, Sphingobacteriaceae, Sphingomonadaceae, Staphylococcaceae, Synergistaceae, Thioalkalispiraceae, Verrucomicrobiaceae, Vibrionaceae, Xanthobacteraceae, and Xanthomonadaceae.

In still other embodiments, the spent material 108 may comprise a mixture of activated carbon and the biological material. Mixtures of carbon and biological material are utilized to treat both readily biodegradable compounds, as well as lesser readily biodegradable compounds, such as recalcitrant organics. Within the wet air oxidation unit 102, the combined waste stream 104 may comprise the spent material 108 and the spent caustic 106 in any suitable ratio. In an embodiment, the ratio of the spent material 108 to the spent caustic 106 is from 1:1 to 100:1, and in a particular embodiment is from 1:1 to 50:1.

The wet air oxidation unit 102 may comprise one or more dedicated reactor vessels in which oxidation and/or regeneration of the spent material 108 takes place. The regeneration process therein typically involves treatment of the incoming feed with an oxidant, generally molecular oxygen from an oxygen-containing gas, at elevated temperatures and pressures (relative to ambient conditions). In an embodiment, the wet air oxidation process is done at a pressure from about 20 atm to about 240 atm and at a temperature from about 150° C. to about 373° C. with the addition of oxygen to the feed stream or the wet air oxidation unit 102. In an embodiment, sufficient oxygen is provided to the unit to provide an offgas having an oxygen concentration of at least 3 vol. %, and in a particular embodiment from 5-15 vol. % oxygen.

In an embodiment, the wet air oxidation process is carried out at a temperature of 250° C. or less with a residence time of at least about 30 minutes. In a particular embodiment, the wet air regeneration is carried out at a temperature of about 200° C. or less, and in a particular embodiment from about 150° C. to about 200° C. for a duration of at least about 1 hour, and in a particular embodiment from about 3 to 8 hours.

The wet air oxidation process destroys a volatile portion of the biological solids and oxidizes and/or changes the organic substances adsorbed on the activated carbon to restore its adsorptive capacity, and results in a regenerated slurry (regenerated material 110). The regenerated material 110 comprises reactivated carbon particles and/or biological solids suitable for reuse. In certain embodiments, the regenerated material 110 comprises inorganic ash particles removed from the wastewater by the carbon and formed during the regeneration process. The ash may be further separated from the regenerated slurry by known separation methods such as those reported in U.S. Pat. Nos. 4,778,598 and 4,749,492, both of which are incorporated herein by reference in their entireties for all purposes.

Further, in certain embodiments, it may be desirable to minimize the effects of the high pH spent caustic such that the pH of the combined stream 104 is not above a desired value for the oxidation. Advantageously, the wet air oxidation process typically generates an amount of $CO_2$ from the oxidation of organics. The generated $CO_2$ may act to neutralize the pH increasing effect of the spent caustic portion in the combined stream 104 such that no pH modifier need be added.

Figure 2:
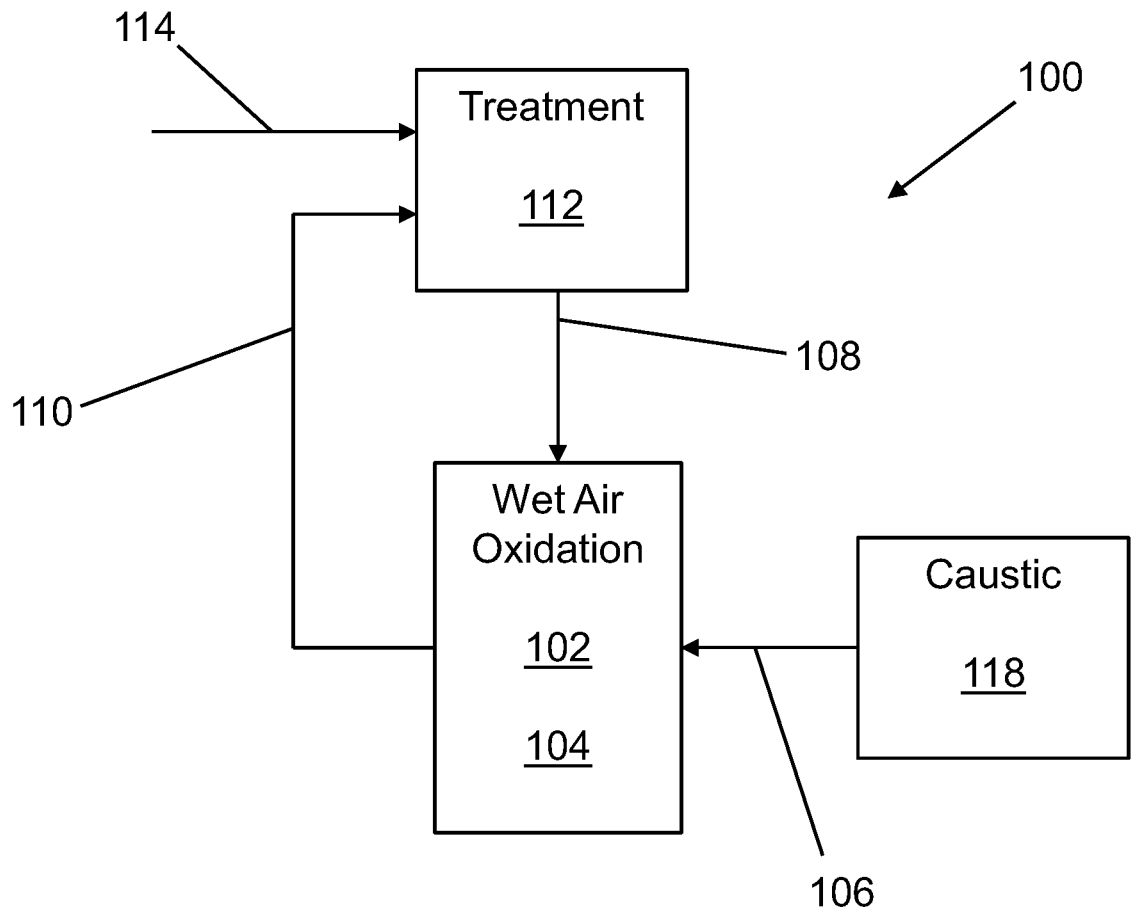
FIG. 2 is a schematic of a wet air oxidation (WAO) system in accordance with another aspect of the present invention.

Referring now to FIG. 2, it is shown that the spent material is generated from one or more treatment vessels (treatment vessel) 112 which contain activated carbon and/or biological material therein. A wastewater feed 114 comprising an amount of contaminants, e.g., COD, treatable by the activated carbon and/or biological material therein is delivered to the vessel 112. The wastewater feed 114 is acted upon by the activated carbon and/or biological material to generate a treated stream (not shown), which may be directed to a further treatment or polishing step, to discharge, or to storage. After amount of time, the ability of the activated carbon and/or biological material to reduce a concentration of targeted contaminants is itself reduced, thereby generating the spent material 108 as described herein.

Once an amount of the spent material 108 is available, the spent material 108 may be directly or indirectly fed to the wet air oxidation unit 102 by a fluid line or the like. The spent caustic 106 may then be combined with the spent material at any suitable location in the system 100. In certain embodiments, each of the spent material 108 and the spent caustic 106 are independently delivered to the wet air oxidation unit 102 and combined (and optionally mixed therein) as shown in FIG. 2. For example, the spent caustic 106 may be delivered to the wet air oxidation unit 102 from a suitable source 118 thereof while the spent material 108 is delivered to the wet air oxidation unit 102 from the vessel 112. In other embodiments, the spent caustic 106 and the spent material 108 may be combined externally of the wet air oxidation unit 102, and the combined stream thereof 104 delivered to the wet air oxidation unit 102. In an embodiment, the spent caustic 106 and the spent material 108 are combined with the fluid line 116 or the like. In other embodiments, the spent caustic 106 and the spent material 108 are combined in a suitable mixing tank with the resulting combined waste stream 104 delivered to the wet air oxidation unit 102.

Within the wet air oxidation unit 102, the combined waste stream 104 is subjected to wet air oxidation as described above to generate the regenerated material stream 110. In certain embodiments, the regenerated material stream 110 comprising regenerated activated carbon and/or biological material is directed to back to the vessel 112 via recirculation line for subsequent treatment of stream 12. In certain embodiments, fresh activated carbon and/or biological material may be introduced to the vessel 112 in lieu of or in addition to the regenerated material.

In the embodiments described herein, it is appreciated that one or more inlets, pathways, heaters, blowers, outlets, pumps, valves, coolers, energy sources, flow sensors, or controllers (comprising a microprocessor and a memory), or the like may be included in any of the systems described herein for facilitating the introduction, output, timing, volume, selection, and direction of flows of any of the components (e.g., regenerated material, spent caustic, spent material, wastewater feed, combined stream, oxygen cooling fluids, etc.) therein. A further exemplary WAO system and components thereof are set forth in U.S. Pat. No. 8,501,011, which is incorporated by reference herein.

The function and advantages of these and other embodiments of the present invention will be more fully understood from the following examples. These examples are intended to be illustrative in nature and are not considered to be limiting the scope of the invention.

EXAMPLES

Example 1

To illustrate the addition of various ratios of spent caustic to spent carbon had minimal effect on the regeneration of the spent carbon, the following experiment was performed. A slurry comprising spent carbon was mixed with various concentrations of spent caustic and treated in batch autoclaves that simulated treatment in a full scale system. The efficiency of the regenerated carbon was analyzed using an MRE (molasses relative efficiency). As illustrated in the below table, there was only a minor decrease in adsorption efficiency as the spent caustic concentration was increased, thereby indicating that the spent caustic did not have a material effect on the regeneration of spent carbon.

| Test Condition | Calculated x/m at 90% Abs Reduction | MRE (%) | % Caustic in oxidized sample | MRE (compared to no SC case) |
|---|---|---|---|---|
| HDH Carbon Standard | 0.0549 | | | |
| No Spent Caustic Added | 0.0644 | 117% | 0.00% | 100% |
| 1 part SC to 29 parts WAR | 0.0613 | 112% | 3.33% | 95% |
| 1 part SC to 19 parts WAR | 0.0608 | 111% | 5.00% | 94% |
| 1 part SC to 4 parts WAR | 0.0536 | 98% | 20% | 83% |

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A treatment system comprising:
    a wet air oxidation unit;
    within the wet air oxidation unit, a combined wastewater stream comprising a spent caustic and a spent material, wherein the wet air oxidation unit is configured to carry out a wet air oxidation process on the combined waste stream at elevated temperature and pressure in the presence of oxygen to produce a regenerated spent material stream, wherein the spent material comprises a combination of spent carbon and spent biological material, and wherein a ratio of the amount of spent material to the amount of spent caustic is from 1:1 to 1:100; and a treatment vessel upstream and in fluid communication with the wet air oxidation unit, wherein the treatment vessel is operable to generate the spent material, and wherein the treatment vessel is configured to receive at least a portion of the regenerated spent material stream.

2. The treatment system of claim 1, wherein the wet air oxidation process is carried out at a temperature of 250° C. or less with a residence time of at least about 30 minutes.

3. The treatment system of claim 1, wherein the wet air oxidation process is carried out at a temperature of 200° C. or less with a residence time of at least about 1 hour.

4. The treatment system of claim 1, the treatment vessel comprising an amount of a member selected from the group consisting of activated carbon, biological material, and combinations of therein.

5. The treatment system of claim 4, further comprising a recirculation line extending from the wet air oxidation unit to the treatment vessel for delivery of the regenerated spent material stream to the treatment vessel.

6. The treatment system of claim 1, wherein a ratio of the amount of spent material to the amount of spent caustic is from 1:1 to 50:1.

7. The treatment system of claim 1, further comprising a source of the spent caustic and a source of the spent material in fluid communication with the wet air oxidation unit.

8. A treatment system comprising:

a wet air oxidation unit;

within the wet air oxidation unit, a combined wastewater stream comprising a spent caustic and a spent material, wherein the wet air oxidation unit is configured to carry out a wet air oxidation process on the combined waste stream in the presence of oxygen to produce a regenerated spent material stream, wherein the wet air oxidation process is carried out at a temperature of 250° C. or less with a residence time of at least about 30 minutes, wherein the spent material comprises a combination of spent carbon and spent biological material, and wherein a ratio of the amount of spent material to the amount of spent caustic is from 1:1 to 1:100; and a treatment vessel upstream and in fluid communication with the wet air oxidation unit, wherein the treatment vessel is operable to generate the spent material, and wherein the treatment vessel is configured to receive at least a portion of the regenerated spent material stream.

9. The treatment system of claim 8, wherein a ratio of the amount of spent material to the amount of spent caustic is from 1:1 to 50:1.

* * * * *